US012625578B2

(12) United States Patent
Collins et al.

(10) Patent No.: US 12,625,578 B2
(45) Date of Patent: May 12, 2026

(54) DYNAMIC CONFIGURATION OF DRIVEN SHIELD BGA BALLS OF A CAPACITIVE SENSOR ARRAY

(71) Applicant: Microchip Touch Solutions Limited, Wokingham (GB)

(72) Inventors: Richard P. Collins, Southampton (GB); Tor Erik Leistad, Trondheim (NO)

(73) Assignee: Microchip Touch Solutions Limited, Wokingham (GB)

( * ) Notice: Subject to any disclaimer, the term of this patent is extended or adjusted under 35 U.S.C. 154(b) by 0 days.

(21) Appl. No.: 19/078,145

(22) Filed: Mar. 12, 2025

(65) Prior Publication Data

US 2025/0291439 A1 Sep. 18, 2025

Related U.S. Application Data

(60) Provisional application No. 63/565,434, filed on Mar. 14, 2024.

(51) Int. Cl.
G06F 3/041 (2006.01)
G06F 3/044 (2006.01)

(52) U.S. Cl.
CPC ........ G06F 3/04164 (2019.05); G06F 3/0446 (2019.05); G06F 2203/04107 (2013.01)

(58) Field of Classification Search
CPC .............. G06F 3/04164; G06F 3/0446; G06F 2203/04107; G06F 3/041; G06F 3/044
See application file for complete search history.

(56) References Cited

U.S. PATENT DOCUMENTS

| | | | | |
|---|---|---|---|---|
| 2013/0215049 A1* | 8/2013 | Lee | ......................... | G06F 3/041 |
| | | | | 345/173 |
| 2018/0335872 A1* | 11/2018 | Vinje | .................. | G06F 3/04186 |
| 2020/0161413 A1* | 5/2020 | Kirkman | ................ | H01L 23/48 |
| 2023/0010436 A1 | 1/2023 | Vinje | | |
| 2023/0290176 A1* | 9/2023 | Kasilya | .................. | G06F 3/043 |
| 2023/0290715 A1* | 9/2023 | Li | ..................... | H01L 23/49838 |

OTHER PUBLICATIONS

International Search Report of International Application No. PCT/US2025/019633, mailed Jun. 10, 2025, 3 pages.
Written Opinion of the International Searching Authority of International Application No. PCT/US2025/019633, mailed Jun. 10, 2025, 4 pages.

* cited by examiner

*Primary Examiner* — Md Saifula A Siddiqui
(74) *Attorney, Agent, or Firm* — TraskBritt

(57) ABSTRACT

An apparatus may include a capacitive touch controller, a ball grid array package, firmware, and a driven shield driver circuitry. The ball grid array package may comprise a plurality of balls arranged in multiple concentric rings. The firmware may dynamically select a driven shield pattern based on a received aspect ratio input corresponding to a capacitive sensor array. The driven shield driver circuitry may activate the driven shield balls according to the dynamically selected driven shield pattern to electrically isolate drive balls from sense balls.

26 Claims, 8 Drawing Sheets

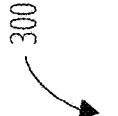
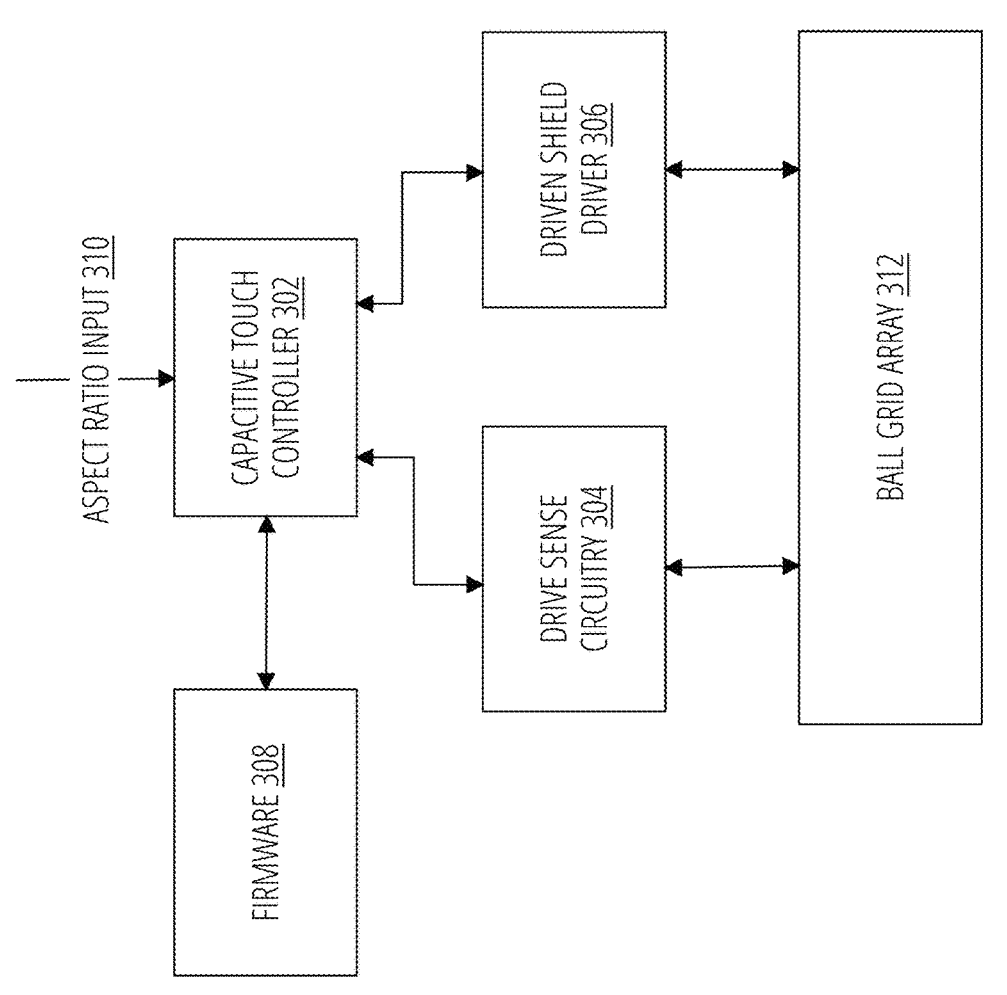
*FIG. 3*

400

RECEIVE ASPECT RATIO INPUT 402

RETRIEVE DRIVEN SHIELD PATTERN CORRESPONDING TO RECEIVED ASPECT RATIO INPUT 404

CONFIGURE BALL FUNCTIONS OF BALL GRID ARRAY ACCORDING TO RETRIEVED DRIVEN SHIELD PATTERN 406

ACTIVATE CONFIGURED DRIVEN SHIELD BALLS 408

RECEIVE FURTHER ASPECT RATIO INPUT 410

RETRIEVE FURTHER DRIVEN SHIELD PATTERN CORRESPONDING TO RECEIVED FURTHER ASPECT RATIO INPUT 412

FURTHER CONFIGURE BALL FUNCTIONS OF BALL GRID ARRAY ACCORDING TO RETRIEVED FURTHER DRIVEN SHIELD PATTERN 414

ACTIVATE FURTHER CONFIGURED DRIVEN SHIELD BALLS 416

*FIG. 4*

DYNAMIC CONFIGURATION OF DRIVEN SHIELD BGA BALLS OF A CAPACITIVE SENSOR ARRAY

CROSS REFERENCE TO RELATED APPLICATIONS

This application claims the benefit under 35 U.S.C. § 119(e) of the priority date of U.S. Provisional Patent Application Ser. No. 63/565,434, filed Mar. 14, 2024, for "TOUCH SENSOR X TO Y BGA PACKAGE CROSSTALK REDUCTION WITH A MOVING DRIVEN SHIELD," the contents and disclosure of which is incorporated herein in its entirety by this reference.

FIELD

Capacitive touch sensing systems are widely utilized in electronic devices to provide intuitive user interfaces. These systems typically employ sensor arrays comprising intersecting drive and sense lines, detecting user inputs through capacitive coupling changes at intersections.

BACKGROUND

Capacitive touch sensing systems are widely utilized in electronic devices to provide intuitive user interfaces. These systems typically employ sensor arrays comprising intersecting drive and sense lines, detecting user inputs through capacitive coupling changes at intersections.

In the implementation of capacitive touch controllers, integrated circuits (ICs) are commonly packaged using ball grid array (BGA) packaging, which offers high pin-density and compact form factors advantageous for space-constrained applications. However, the dense configuration of balls within BGA packages can lead to capacitive coupling issues, commonly known as crosstalk, adversely affecting system performance.

BRIEF DESCRIPTION OF THE DRAWINGS

To easily identify the discussion of any particular element or act, the most significant digit or digits in a reference number refer to the figure number in which that element is first introduced.

FIG. 3 is a block diagram illustrating a capacitive touch sensor system 300 incorporating dynamically configurable shielding, in accordance with one or more examples.

FIG. 4 illustrates an example process 400 to dynamically configure a driven shield ball(s) for a BGA operable to be coupled to a capacitive sensor array, in accordance with one or more examples.

DETAILED DESCRIPTION

Figure 1:
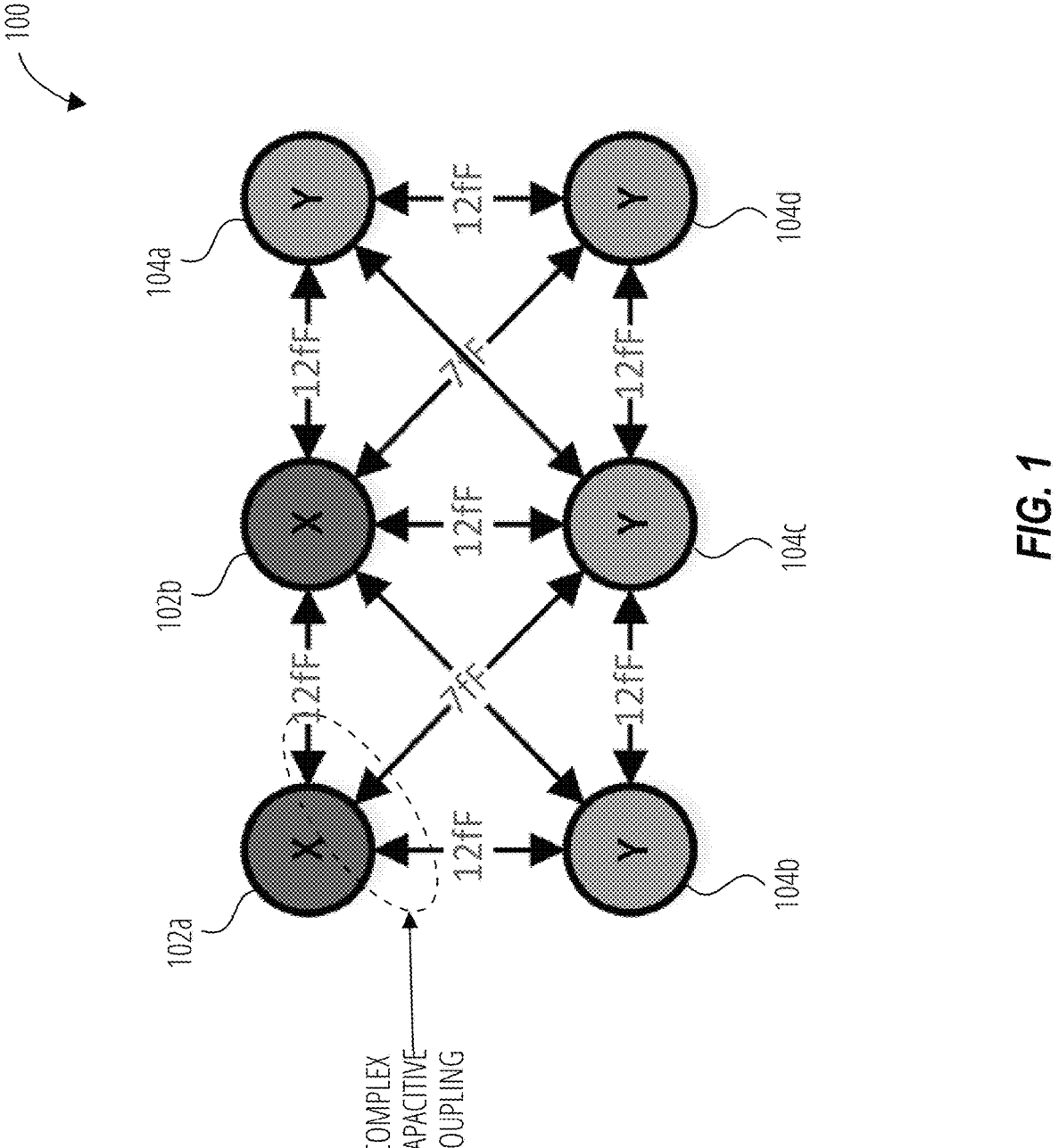
FIG. 1 is a schematic diagram illustrating pin-to-pin capacitive coupling within a BGA package for a capacitive touch sensor controller, in accordance with one or more examples.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer, including a processor is considered a special-purpose computer while the general-purpose computer executes computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," on, "underlying," "upper," "lower," without limitation, is used for clarity and convenience in understanding the disclosure and accompanying drawings and does not connote or depend on any specific preference, orientation, or order, except where the context clearly indicates otherwise.

In this description the term "coupled," and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

As used herein, the terms "assert," "de-assert" and derivatives thereof used in reference to a pin, means, respectively, to assert or de-assert a signal associated with the pin (e.g., a signal specifically assigned to the pin or a signal to which the pin is specifically assigned, without limitation).

Capacitive touch controllers typically utilize pins for transmitting drive signals (TX) and receiving sense signals (RX), which are carefully arranged to reduce crosstalk caused by unwanted capacitive coupling. Historically, this has been addressed in thin quad flat pack (TQFP) packages by physically separating or interposing driven shield pins between TX and RX pins. However, TQFP solutions become inadequate when used with BGA packages, particularly when supporting flexible aspect ratios, such configurations involve dynamically varying arrangements of drive and sense pins, exacerbating pin-to-pin capacitive coupling challenges.

Traditional capacitive sensor controllers designed for flexible aspect ratios may suffer from substantial signal crosstalk, especially in BGA packages. Crosstalk arises primarily due to proximity-induced capacitive coupling between adjacent TX and RX pins. Techniques, such as using a single driven shield pin as sometimes seen in TQFP packages, fail to adequately mitigate crosstalk in BGA packages due to multiple coupling paths created by the ball grid structure. This creates significant noise, adversely affecting measurement accuracy and device performance.

An approach is introduced to mitigate crosstalk in BGA-packaged capacitive touch controllers configured for flexible aspect ratio touch sensing. One or more examples, employ a dynamically configurable "moving driven shield" implemented through a strategic arrangement of multiple shield balls within a BGA package.

The driven shield pins are interposed at a crossover boundary between drive (TX) and sense (RX) balls, specifically arranged to prevent direct capacitive coupling paths one or more of: vertically, horizontally, and diagonally. Depending on the configured aspect ratio of the sensor array, the firmware dynamically selects a pattern of shield balls to optimally isolate drive from sense pins. Additionally, power and ground balls are strategically positioned to assist in effective shielding, particularly at package corners.

This approach significantly reduces unwanted capacitive coupling, as simulation results demonstrate a reduction from 166 femtofarads (fF; without shielding) to 8.8 fF with the proposed ball pattern. The technique ensures effective isolation regardless of aspect ratio changes, maintaining critical isolation parameters by adhering to layout rules that prevent routing tracks next to signals separated by more than four sense lines.

FIG. 1 is a schematic diagram illustrating pin-to-pin capacitive coupling within a BGA package for a capacitive touch sensor controller, in accordance with one or more examples. FIG. 1 specifically depicts a simplified portion of a pin array 100 comprising drive pins 102a and 102b (also called X pins) and sense pins 104a, 104b, 104c, and 104d (also called Y pins). Arrows between the pins represent undesirable capacitive coupling paths, each annotated with respective capacitance values measured in femtofarads (fF). The values of coupling paths depicted in FIG. 1 are non-limiting examples. In the specific example depicted by FIG. 1, horizontal coupling paths between adjacent pins exhibit a capacitance of approximately 12 fF, whereas diagonal coupling paths exhibit a lower capacitance of approximately 7 fF.

The diagram of FIG. 1 visually emphasizes the multiple coupling interactions in densely packed BGA arrangements.

Each drive ball can couple to multiple adjacent sense balls through direct vertical, horizontal, and diagonal connections, resulting in intricate capacitance interactions that cannot be practically neutralized by charge injection or single-shield pin approaches.

To effectively manage this complexity, the examples discussed herein employ a dynamically configurable pattern of multiple driven shield balls arranged strategically at crossover boundaries between drive and sense balls. These shield balls ensure there are no direct capacitive coupling paths between drive and sense balls, effectively isolating them vertically, horizontally, and diagonally, and thus significantly reducing unwanted crosstalk. This approach overcomes the limitations of traditional charge compensation methods by physically and electrically isolating potential coupling paths rather than attempting to compensate for them after they have occurred.

Figure 2:
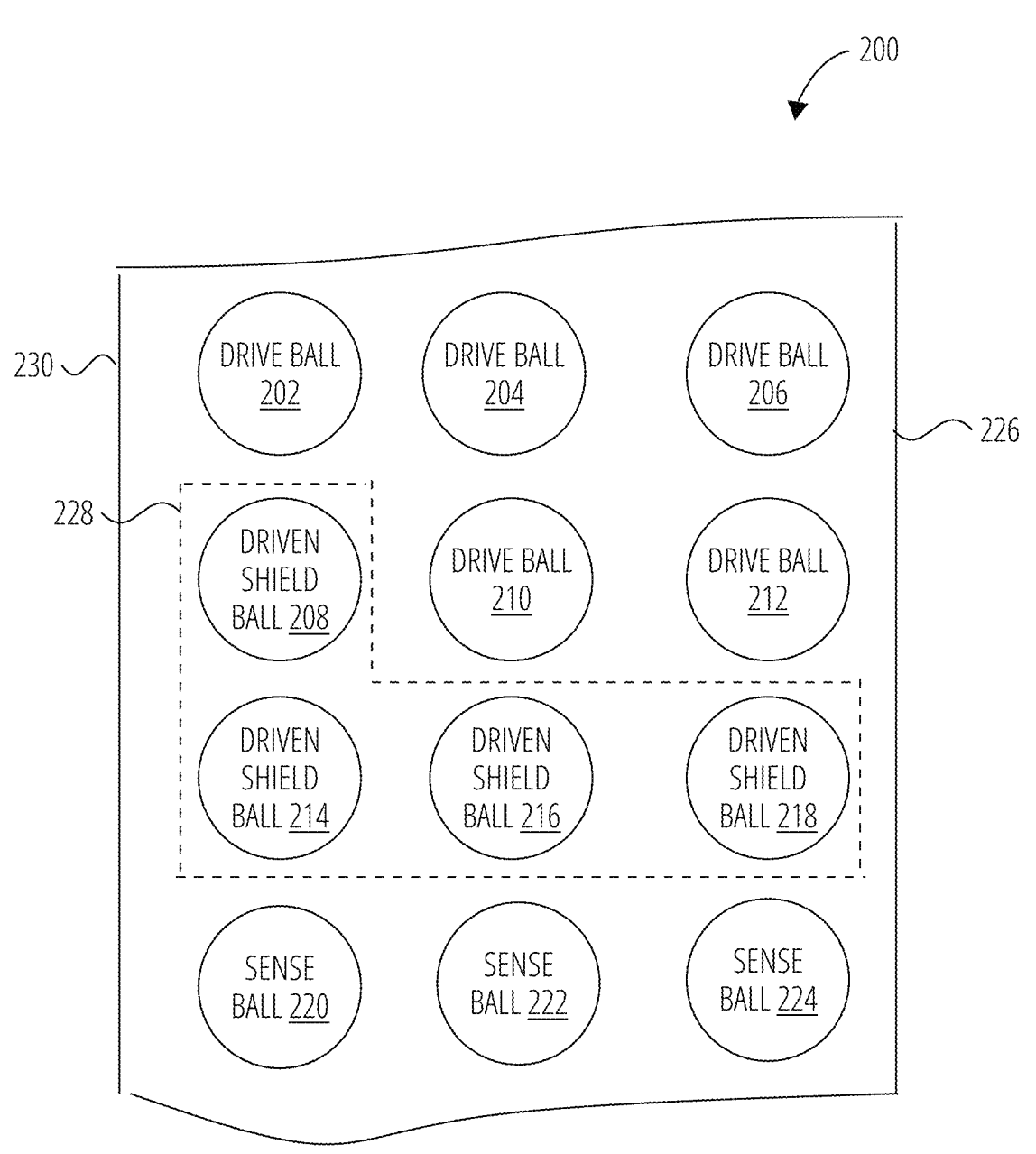
FIG. 2 illustrates a detailed, schematic layout representation of a portion of the BGA package 200 for a capacitive touch sensor controller, in accordance with one or more examples.

FIG. 2 illustrates a detailed, schematic layout representation of a portion of the BGA package 200 for a capacitive touch sensor controller, emphasizing the placement of driven shield balls relative to drive (TX) and sense (RX) balls, in accordance with one or more examples. The depicted portion of the BGA package 200 illustrates a specific arrangement wherein drive balls (202, 204, 206, 210, 212), driven shield balls (208, 214, 216, 218), and sense balls (220, 222, 224) are clearly indicated. Boundaries (226, 228, 230) represent edges of this localized portion of the overall BGA substrate.

Notably, FIG. 2 demonstrates the strategic positioning of driven shield balls (208, 214, 216, 218) interposed between the group of drive balls (202, 204, 206, 210, 212) and sense balls (220, 222, 224) to form a crossover boundary 228 indicated as a delineated area including the driven shield balls between the drive balls and sense balls. This arrangement ensures no direct vertical, horizontal, or diagonal paths exist for unwanted capacitive coupling between the drive balls and the sense balls. Such a strategic arrangement substantially reduces pin-to-pin capacitive coupling, thereby addressing the technical problem of undesirable crosstalk in densely packed BGA configurations, especially as the number and arrangement of drive and sense balls dynamically vary to accommodate different sensor aspect ratios.

In one or more examples, a single controller may be used across multiple aspect ratios, thereby requiring the driven shield to dynamically move its position. The moving driven shield's position may be determined dynamically by firmware based on the particular configuration of X and Y sense lines, reflecting a desired selected aspect ratio. This flexibility maintains effective shielding as the screen aspect ratio varies, ensuring the proper capacitive isolation regardless of screen configuration changes.

The driven shield balls are configured by firmware settings within the controller, allowing the same device to adapt to multiple sensor aspect ratios. As the aspect ratio changes, the crossover boundary—defined by the driven shield balls—also shifts its position within the ball grid to maintain optimal capacitive isolation between drive and sense balls, preventing unwanted capacitive coupling paths. This ensures effective isolation for diverse sensor layouts without requiring dedicated controller packages for each aspect ratio, significantly enhancing flexibility and efficiency in sensor controller utilization.

FIG. 3 is a block diagram illustrating a capacitive touch sensor system 300 incorporating dynamically configurable shielding, in accordance with one or more examples. The system 300 includes a capacitive touch controller 302 operatively coupled to firmware 308 configured to control system operation based on parameters indicating the aspect ratio of a capacitive sensing array received at aspect ratio input 310.

The capacitive touch controller 302 interacts with drive and sense circuitry 304 and a driven shield driver 306. The drive and sense circuitry 304 generates drive signals and measures capacitive coupling responses from the sense lines in a BGA 312. Concurrently, the driven shield driver 306 generates static shield signals that are applied to dynamically selected balls within the BGA 312 to serve as driven shields.

The firmware 308 provides configurable parameters corresponding to different aspect ratios of the capacitive touch controller 302. Based on these parameters, the capacitive touch controller 302 dynamically configures the driven shield balls' spatial pattern within the crossover boundary between drive balls and sense balls in the BGA 312. The dynamic configuration provided by firmware 308 ensures effective electrical isolation between drive balls and sense balls, substantially reducing or eliminating unwanted capacitive coupling for a wide variety of aspect ratio configurations.

In the case of a capacitive sensor, a capacitive sensor array typically consists of a pattern of conductive electrodes arranged in a grid on a sensor panel or display. This grid comprises drive lines (TX) and sense lines (RX) arranged to form capacitive coupling points at their intersections. The specific physical arrangement of these drive and sense lines defines the aspect ratio of the capacitive sensor array. The BGA 312 (and/or a BGA package including the same and the capacitive touch controller) includes at least balls configured as drive, sense, and driven shield balls (as well as other functional balls depending on operating conditions). These balls connect directly to the drive and sense lines of the capacitive sensor array. Thus, the arrangement of balls within the BGA, especially the positioning of driven shield balls, dynamically adapts based on the configuration (aspect ratio) of the connected sensor array to effectively isolate drive balls from sense balls and minimize capacitive crosstalk.

Thus, the BGA layout is directly determined by and tailored to match the capacitive sensor array layout, ensuring optimal signal integrity and performance.

An aspect ratio input 310 is received by the capacitive touch controller 302, enabling it to adaptively control the pattern of driven shield balls, thereby optimizing capacitive isolation and minimizing signal crosstalk regardless of specific sensor configurations. This block diagram clearly demonstrates the interaction among system components and highlights the novel dynamic configuration capability that solves the technical challenges associated with flexible aspect ratio capacitive sensor packaging in BGAs.

FIG. 4 illustrates an example process 400 to dynamically configure a driven shield ball(s) for a BGA operable to be coupled to a capacitive sensor array, in accordance with one or more examples. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. Some or a totality of operations of process 400 may be performed, as a non-limiting example, by capacitive touch sensor system 300.

According to some examples, the method includes receiving aspect ratio input at operation 402. The capacitive touch controller receives a configuration input specifying the desired aspect ratio of the capacitive sensing array. This input may be provided through a user interface, firmware parameter selection, or another system input method.

According to some examples, the method includes retrieving driven shield pattern corresponding to received aspect ratio input at operation 404. Upon receiving the aspect ratio input, the capacitive touch controller interacts with firmware containing a stored configuration file or data structure. This stored information includes detailed predefined layouts of driven shield ball positions corresponding to various aspect ratios supported by the controller. The firmware evaluates the received aspect ratio input and selects the specific shield pattern configuration from the stored configuration data that matches the received aspect ratio. Each shield pattern configuration includes identifiers of balls to be activated as driven shield balls.

According to some examples, the method includes configuring ball functions of BGA according to retrieved driven shield pattern at operation 406. Upon receiving the aspect ratio input, the capacitive touch controller interacts with firmware containing a stored configuration file or data structure. This stored information includes detailed predefined layouts of driven shield ball positions corresponding to various aspect ratios supported by the controller. The firmware evaluates the received aspect ratio input and selects the specific shield pattern configuration from the stored configuration data that matches the received aspect ratio. Each shield pattern configuration includes identifiers of balls to be activated as driven shield balls.

According to some examples, the method optionally includes activating configured driven shield balls at operation 408. With the balls appropriately configured, the driven shield driver provides shield signals to the activated driven shield balls. These signals electrically isolate drive balls from sense balls, eliminating direct capacitive coupling paths (vertical, horizontal, and diagonal).

The capacitive touch controller begins normal operation with the new ball configuration. Drive signals are transmitted via drive balls, and sense signals are received via sense balls. Driven shield balls maintain isolation, ensuring reduced crosstalk and improved sensor accuracy.

According to some examples, the method optionally includes receiving further aspect ratio input at operation 410. The capacitive touch controller continuously monitors for new aspect ratio inputs. If a new aspect ratio is detected or requested, the operational flow initiates a new shield configuration cycle.

According to some examples, the method optionally includes retrieving further driven shield pattern corresponding to received further aspect ratio input at operation 412.

According to some examples, the method optionally includes further configuring ball functions of BGA according to retrieved further driven shield pattern at operation 414.

According to some examples, the method optionally includes activating further configured driven shield balls at operation 416.

As mentioned above, systems support adapting a driven shield pattern dynamically, controlled by firmware, to optimally mitigate crosstalk across a variety of aspect ratios.

Figure 5:
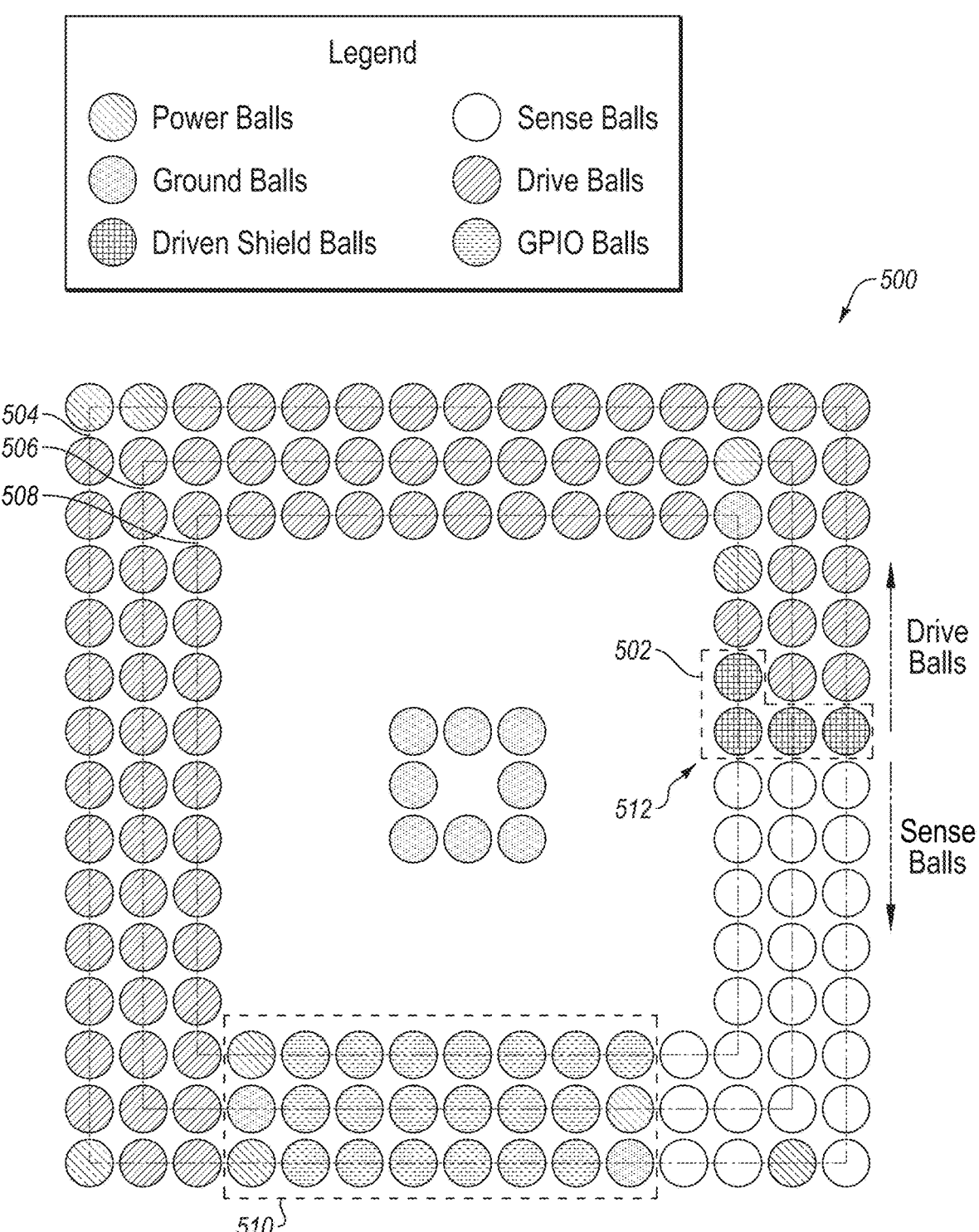
FIG. 5 is a detailed, schematic layout of a BGA package 500 for a capacitive touch sensor controller, in accordance with one or more examples.
Figure 6:
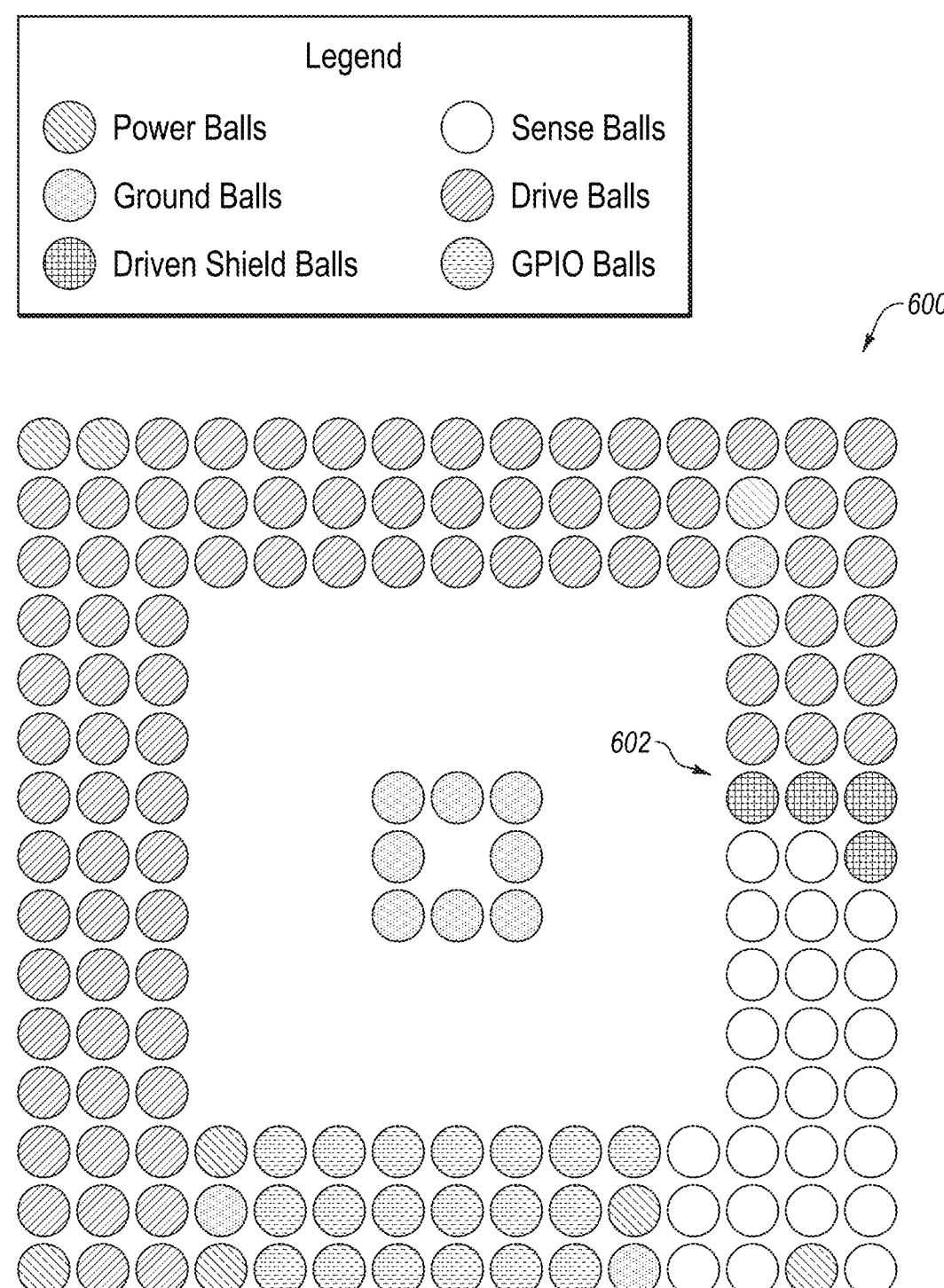
FIG. 6 depicts a detailed schematic of BGA package 600 for a capacitive touch sensor controller, specifically showing an alternative arrangement of balls optimized for different sensor aspect ratio configurations compared to that shown in FIG. 5.
Figure 7:
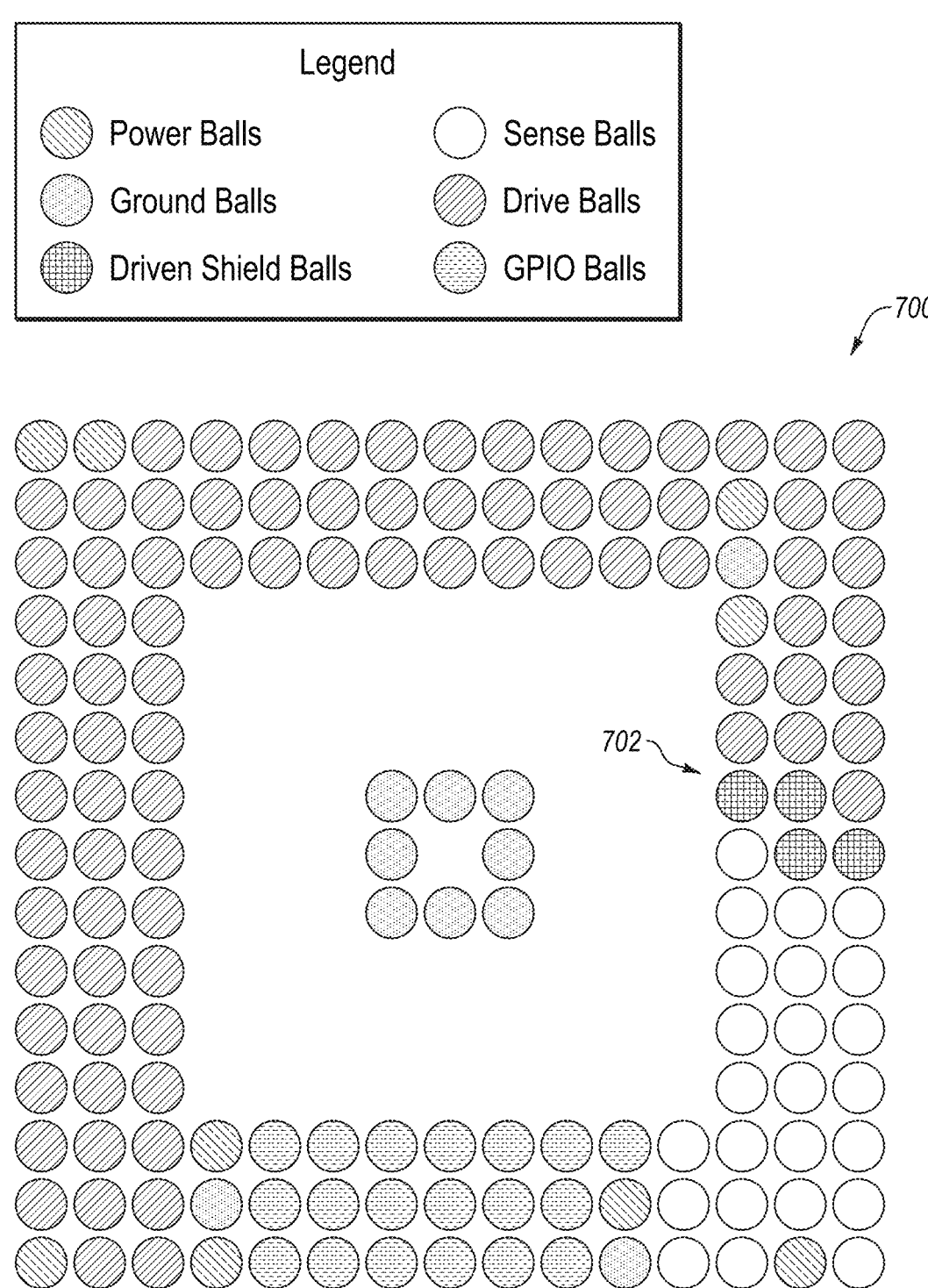
FIG. 7 depicts a detailed schematic of BGA package 700 for a capacitive touch sensor controller, specifically showing an alternative arrangement of balls optimized for different sensor aspect ratio configurations compared to that shown in FIG. 5.

FIG. 5, FIG. 6, and FIG. 7 Illustrate ball arrangements showing drive balls, sense balls, shield balls, power balls, ground balls, and GPIO balls. These arranges demonstrate the shifting pattern of driven shield balls to accommodate aspect ratio variations, maintaining the required isolation.

FIG. 5 is a detailed, schematic layout of a BGA package 500 for a capacitive touch sensor controller, in accordance with one or more examples.

The BGA package 500 comprises multiple rings of balls (first ring 504, second ring 506, and third ring 508) with marked functional assignments, including drive balls, sense balls, driven shield balls, ground balls, power supply balls, and general-purpose input/output (GPIO) balls.

FIG. 5 depicts a crossover boundary 502 defined by driven shield balls 512 arranged between drive balls and sense balls. This driven shield boundary prevents direct capacitive coupling paths-vertical, horizontal, or diagonal-between drive balls and sense balls, effectively minimizing unwanted crosstalk.

The driven shield balls 512 are placed to form a flexible shielding configuration that dynamically adaptable to changes in sensor array aspect ratios. The arrangement ensures effective isolation under varying configurations by utilizing multiple driven shield balls, depicted here. Additionally, the strategic positioning of power balls (brown) and ground balls (green) near the outer corners aids in providing supplementary shielding at corner regions and at the boundary of region 510, which includes GPIO balls, further reinforcing capacitive isolation.

FIG. 6 depicts a detailed schematic of BGA package 600 for a capacitive touch sensor controller, specifically showing an alternative arrangement of balls optimized for different sensor aspect ratio configurations compared to that shown in FIG. 5. The BGA package 600 comprises multiple concentric rings of balls categorized as drive balls, sense balls, driven shield balls, ground balls, power supply balls, and general-purpose input/output (GPIO) balls, similar to BGA package 500.

Notably, FIG. 6 shows the dynamic capability of the moving driven shield configuration. Compared to FIG. 5, the pattern and positioning of driven shield balls 602 are shifted to accommodate a different aspect ratio configuration of the sensor array. Dynamically selecting and positioning driven shield balls 602 as depicted to ensure effective isolation between drive balls and sense balls, depending upon the specific layout of the sensing matrix, including without limitation a specific aspect ratio, required for a given application.

FIG. 6 illustrates how the position of driven shield balls 602 is chosen to maintain shielding. The arrangement prevents direct capacitive coupling between drive and sense balls, significantly reducing unwanted crosstalk. Additionally, the placement of ground and power balls at strategic locations, particularly in corners or edges, and around GPIO balls, provides supplemental shielding support, ensuring complete isolation and maintaining the design requirements across a variety of sensor aspect ratios and configurations.

FIG. 7 depicts a detailed schematic of BGA package 700 for a capacitive touch sensor controller, specifically showing an alternative arrangement of balls optimized for different sensor aspect ratio configurations compared to that shown in FIG. 5.

Notably, the crossover boundary 702, defined by the driven shield balls, has shifted to accommodate a different screen aspect ratio. The driven shield balls have moved in position, illustrating the flexibility and adaptability of the moving driven shield strategy. By repositioning the driven shield balls, capacitive isolation is maintained between drive balls and sense balls in varying screen aspect ratio configurations. The boundary formed by the driven shield balls dynamically adjusts in response to the sensor aspect ratio to maintain effective isolation, thus emphasizing the capability of providing robust capacitive isolation across diverse application scenarios and configurations.

It will be appreciated by those of ordinary skill in the art that functional elements of examples disclosed herein (e.g., functions, operations, acts, processes, or methods) may be implemented in any suitable hardware, software, firmware, or combinations thereof.

Figure 8:
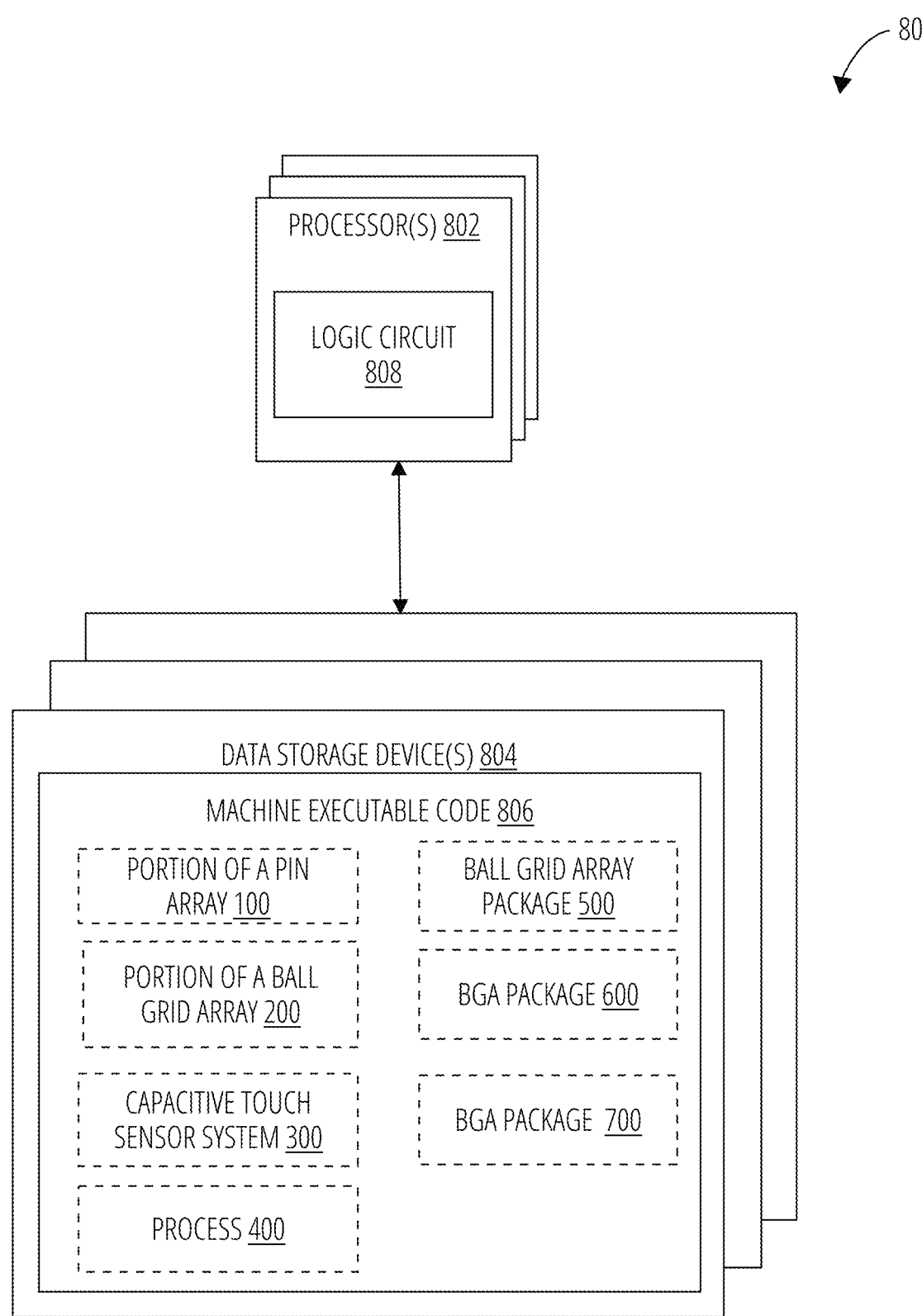
FIG. 8 is a block diagram of circuitry that, in some examples, may be used to implement various functions, operations, acts, processes, or methods disclosed herein.

FIG. 8 illustrates non-limiting examples of implementations of functional elements disclosed herein. In some examples, some or all portions of the functional elements disclosed herein may be performed by hardware capable of carrying out the functional elements.

FIG. 8 is a block diagram of a circuitry 800 that, in some examples, may be used to implement various functions, operations, acts, processes, or methods disclosed herein. The circuitry 800 includes one or more processors 802 (sometimes referred to herein as "processors 802") operably coupled to one or more data storage devices 804 (sometimes referred to herein as "storage 804"). The storage 804 includes machine executable code 806 stored thereon, and the processors 802 include logic circuit 808. The machine executable code 806 includes information describing functional elements that may be implemented by (e.g., performed by) the logic circuit 808. The logic circuit 808 is adapted to implement (e.g., perform) the functional elements described by the machine executable code 806. The circuitry 800, when executing the functional elements described by the machine executable code 806, should be considered as special purpose hardware for carrying out functional elements disclosed herein. In one or more examples, the processors 802 may perform the functional elements described by the machine executable code 806 sequentially, concurrently (e.g., on one or more different hardware platforms), or in one or more parallel process streams.

When implemented by logic circuit 808 of the processors 802, the machine executable code 806 adapts the processors 802 to perform operations of examples disclosed herein. By way of non-limiting example, the machine executable code 806 may adapt the processors 802 to perform some or a totality of operations of dynamically configuring a driven shield ball array based on a desired aspect ratio, including one or more operations of process 400.

Also by way of non-limiting example, the machine executable code 806 may adapt the processors 802 to perform some or a totality of features, functions, or operations disclosed herein for one or more of: portion of a pin array 100, portion of a BGA 200, capacitive touch sensor system 300, BGA package 500, BGA package 600, or BGA package 700.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device (PLD), discrete gate or transistor logic, discrete hardware components, other programmable device, or any combination thereof designed to perform the functions disclosed herein. A general-purpose computer including one or more processors 802, including a general-purpose processor, is considered a special-purpose computer at least while the general-purpose computer executes functional elements corresponding to the machine executable code 806 (e.g., software code, firmware code, configuration data, hardware descriptions, without limitation) related to examples of the present disclosure. It is noted that a general-purpose processor (which may also be referred to herein as a host processor or simply a host) may be a microprocessor, but in the alternative, a general-purpose processor of processors 802 may include any conventional processor, controller, microcontroller, or state-machine. An FPGA or other PLD of the processors 802 may be configured (e.g., programmed, without limitation) with configuration data to perform functions disclosed herein, or, additionally or alternatively, may be capable of being configured or reconfigured (e.g., programmable or re-programmable, without limitation) with configuration data to perform functions disclosed herein. The processors 802 may also be implemented as a combination of computing devices, such as a combination of a DSP and a microprocessor, a plurality of microprocessors, one or more microprocessors in conjunction with a DSP core, or any other such configuration.

In one or more examples, the storage 804 includes volatile data storage (e.g., random-access memory (RAM), static RAM (SRAM), without limitation), non-volatile data storage (e.g., Flash memory, a hard disc drive, a solid-state drive, erasable programmable read-only memory (EPROM), without limitation). In some examples, the processors 802 and the storage 804 may be implemented into a single device (e.g., a semiconductor device product, a system on chip (SOC), without limitation). In some examples, the processors 802 and the storage 804 may be implemented into separate devices.

In one or more examples, the machine executable code 806 may include computer-readable instructions (e.g., software code, firmware code). By way of non-limiting example, the computer-readable instructions may be stored by the storage 804, accessed directly by the processors 802, and executed by the processors 802 using at least the logic circuit 808. Also, by way of non-limiting example, the computer-readable instructions may be stored on the storage 804, transferred to a memory device (not shown) for execution, and executed by the processors 802 using at least the logic circuit 808. Processors 802 or logic circuit 808 thereof may be coupled to such a memory device or include such a memory device (e.g., a configuration memory cell, without limitation). Accordingly, in some examples, the logic circuit 808 includes electrically configurable logic circuit 808.

In one or more examples, the machine executable code 806 may describe hardware (e.g., circuitry) to be implemented in the logic circuit 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog, SystemVerilog or very-large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples, the machine executable code 806 may include an HDL, an RTL, a GL description, a mask level description, other hardware description, or any combination thereof.

In examples where the machine executable code 806 includes a hardware description (at any level of abstraction), a system (not shown, but including the storage 804) implements the hardware description described by the machine executable code 806. By way of non-limiting example, the processors 802 may include a programmable logic device (e.g., an FPGA or a PLC, without limitation), and the logic circuit 808 may be electrically controlled (e.g., via configuration data, without limitation) to implement circuitry corresponding to the hardware description into the logic circuit 808. Also, by way of non-limiting example, the logic circuit 808 may include hard-wired logic manufactured by a manufacturing system (not shown but including the storage 804) according to the hardware description of the machine executable code 806.

Regardless of whether the machine executable code 806 includes computer-readable instructions or a hardware description, the logic circuit 808 is adapted to perform the functional elements described by the machine executable code 806 when implementing the functional elements of the machine executable code 806. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means "some or a totality." As used herein, the term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: An apparatus comprising: a capacitive touch controller; a ball grid array package comprising a plurality of balls arranged in multiple concentric rings; firmware to dynamically select a driven shield pattern based on a received aspect ratio input corresponding to a capacitive sensor array; and driven shield driver circuitry to activate the driven shield balls according to the dynamically selected driven shield pattern to electrically isolate drive balls from sense balls.

Example 2: The apparatus according to Example 1, wherein the balls comprise drive balls, sense balls, and driven shield balls.

Example 3: The apparatus according to Examples 1 and 2, wherein the driven shield balls are positioned along a crossover boundary defined between the drive balls and the sense balls.

Example 4: The apparatus according to any of Examples 1 to 3, wherein the driven shield pattern is configured to prevent direct vertical, horizontal, and diagonal capacitive coupling paths between adjacent drive and sense balls.

Example 5: The apparatus according to any of Examples 1 to 4, wherein the firmware stores multiple predefined driven shield patterns, each pattern corresponding to a different aspect ratio configuration.

Example 6: The apparatus according to any of Examples 1 to 5, wherein the firmware selects a driven shield pattern from the stored predefined patterns upon receiving the aspect ratio input.

Example 7: The apparatus according to any of Examples 1 to 6, wherein individual balls within the BGA package are configurable by the capacitive touch controller as driven shield balls or functional balls including drive balls, sense balls, power balls, ground balls, or general-purpose input/output (GPIO) balls.

Example 8: The apparatus according to any of Examples 1 to 7, comprising power and ground balls positioned at corners of the BGA package to provide supplemental shielding.

Example 9: The apparatus according to any of Examples 1 to 8, wherein the driven shield driver circuitry applies static shield signals to the driven shield balls.

Example 10: The apparatus according to any of Examples 1 to 9, wherein the capacitive touch controller continuously monitors for changes in aspect ratio input to dynamically update the driven shield pattern.

Example 11: The apparatus according to any of Examples 1 to 10, wherein the driven shield pattern includes at least three driven shield balls arranged in an L-shaped configuration.

Example 12: The apparatus according to any of Examples 1 to 11, wherein the driven shield pattern includes four driven shield balls arranged to surround at least one side of adjacent sense balls.

Example 13: The apparatus according to any of Examples 1 to 12, wherein the dynamically selected driven shield pattern reduces ball-to-ball capacitive coupling.

Example 14: A method for dynamically configuring driven shield balls in a capacitive touch sensing system comprising: receiving, at a capacitive touch controller, an aspect ratio input corresponding to a capacitive sensor array coupled to the system; retrieving, from firmware, a driven shield pattern corresponding to the received aspect ratio input; configuring ball functions of a ball grid array package according to the retrieved driven shield pattern; and activating configured driven shield balls to electrically isolate drive balls from sense balls within the ball grid array.

Example 15: The method according to Example 14, further comprising: receiving a further aspect ratio input corresponding to a different capacitive sensor array aspect ratio; retrieving a further driven shield pattern corresponding to the further aspect ratio input; reconfiguring the ball functions of the ball grid array according to the retrieved further driven shield pattern; and activating the reconfigured driven shield balls.

Example 16: The method according to Examples 14 and 15, wherein retrieving the driven shield pattern comprises accessing a stored configuration file maintained by the firmware that contains multiple predefined driven shield patterns.

Example 17: The method according to any of Examples 14 to 16, wherein each of the predefined driven shield patterns corresponds uniquely to a supported sensor aspect ratio.

Example 18: The method according to any of Examples 14 to 17, wherein configuring ball functions comprises individually setting each ball in the ball grid array as a driven shield ball or as a functional ball selected from a group consisting of drive balls, sense balls, power balls, ground balls, and general-purpose input/output balls.

Example 19: The method according to any of Examples 14 to 18, wherein the driven shield pattern is selected to eliminate direct vertical, horizontal, and diagonal capacitive coupling paths between adjacent drive balls and sense balls.

Example 20: The method according to any of Examples 14 to 19, wherein activating the configured driven shield balls comprises applying static shield signals to the driven shield balls using driven shield driver circuitry.

Example 21: The method according to any of Examples 14 to 20, wherein the configured driven shield balls form a crossover boundary between drive balls and sense balls.

Example 22: The method according to any of Examples 14 to 21, wherein the crossover boundary comprises at least three driven shield balls arranged in an L-shaped configuration.

Example 23: The method according to any of Examples 14 to 22, wherein the crossover boundary comprises at least four driven shield balls arranged around at least one side of adjacent sense balls.

Example 24: The method according to any of Examples 14 to 23, wherein the method reduces vertical, horizontal, and diagonal capacitive coupling paths between drive balls and sense balls.

Example 25: The method according to any of Examples 14 to 24, wherein the capacitive touch sensing system continuously monitors for aspect ratio input changes to dynamically update the driven shield pattern.

Example 26: The method according to any of Examples 14 to 25, wherein updating the driven shield pattern comprises retrieving and configuring a new driven shield pattern in response to detecting a change in aspect ratio input.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
   a capacitive touch controller;
   a ball grid array package comprising a plurality of balls arranged in multiple concentric rings;
   firmware to dynamically select a driven shield pattern based on a received aspect ratio input corresponding to a capacitive sensor array; and
   driven shield driver circuitry to activate the driven shield balls according to the dynamically selected driven shield pattern to electrically isolate drive balls from sense balls.

2. The apparatus of claim 1, wherein the balls comprise drive balls, sense balls, and driven shield balls.

3. The apparatus of claim 2, wherein the driven shield pattern is configured to prevent direct vertical, horizontal, and diagonal capacitive coupling paths between adjacent drive and sense balls.

4. The apparatus of claim 1, wherein the firmware stores multiple predefined driven shield patterns, each pattern corresponding to a different aspect ratio configuration.

5. The apparatus of claim 1, wherein the driven shield balls are positioned along a crossover boundary defined between the drive balls and the sense balls.

6. The apparatus of claim 4, wherein the firmware selects a driven shield pattern from the stored predefined driven shield patterns upon receiving the aspect ratio input.

7. The apparatus of claim 1, wherein individual balls within the ball grid array package are configurable by the capacitive touch controller as driven shield balls or functional balls including drive balls, sense balls, power balls, ground balls, or general-purpose input/output (GPIO) balls.

8. The apparatus of claim 1, comprising power and ground balls positioned at corners of the ball grid array package to provide supplemental shielding.

9. The apparatus of claim 1, wherein the driven shield driver circuitry applies static shield signals to the driven shield balls.

10. The apparatus of claim 1, wherein the capacitive touch controller continuously monitors for changes in aspect ratio input to dynamically update the driven shield pattern.

11. The apparatus of claim 1, wherein the driven shield pattern includes at least three driven shield balls arranged in an L-shaped configuration.

12. The apparatus of claim 1, wherein the driven shield pattern includes four driven shield balls arranged to surround at least one side of adjacent sense balls.

13. The apparatus of claim 1, wherein the dynamically selected driven shield pattern reduces ball-to-ball capacitive coupling.

14. A method for dynamically configuring driven shield balls in a capacitive touch sensing system comprising:
   receiving, at a capacitive touch controller, an aspect ratio input corresponding to a capacitive sensor array coupled to the system;
   retrieving, from firmware, a driven shield pattern corresponding to the received aspect ratio input;

configuring ball functions of a ball grid array package according to the retrieved driven shield pattern; and
   activating configured driven shield balls to electrically isolate drive balls from sense balls within the ball grid array.

15. The method of claim 14, further comprising:
   receiving a further aspect ratio input corresponding to a different capacitive sensor array aspect ratio;
   retrieving a further driven shield pattern corresponding to the further aspect ratio input;
   reconfiguring the ball functions of the ball grid array according to the retrieved further driven shield pattern; and
   activating the reconfigured driven shield balls.

16. The method of claim 14, wherein retrieving the driven shield pattern comprises accessing a stored configuration file maintained by the firmware that contains multiple predefined driven shield patterns.

17. The method of claim 16, wherein each of the predefined driven shield patterns corresponds uniquely to a supported sensor aspect ratio.

18. The method of claim 14, wherein configuring ball functions comprises individually setting each ball in the ball grid array as a driven shield ball or as a functional ball selected from a group consisting of drive balls, sense balls, power balls, ground balls, and general-purpose input/output (GPIO) balls.

19. The method of claim 14, wherein the driven shield pattern is selected to eliminate direct vertical, horizontal, and diagonal capacitive coupling paths between adjacent drive balls and sense balls.

20. The method of claim 14, wherein activating the configured driven shield balls comprises applying static shield signals to the driven shield balls using driven shield driver circuitry.

21. The method of claim 14, wherein the configured driven shield balls form a crossover boundary between drive balls and sense balls.

22. The method of claim 21, wherein the crossover boundary comprises at least three driven shield balls arranged in an L-shaped configuration.

23. The method of claim 21, wherein the crossover boundary comprises at least four driven shield balls arranged around at least one side of adjacent sense balls.

24. The method of claim 21, wherein updating the driven shield pattern comprises retrieving and configuring a new driven shield pattern in response to detecting a change in aspect ratio input.

25. The method of claim 14, wherein the method reduces vertical, horizontal, and diagonal capacitive coupling paths between drive balls and sense balls.

26. The method of claim 14, wherein the capacitive touch sensing system continuously monitors for aspect ratio input changes to dynamically update the driven shield pattern.

* * * * *